G. AUBERLIN.
PUNCTURE PROOF PNEUMATIC TIRE.
APPLICATION FILED NOV. 15, 1916.

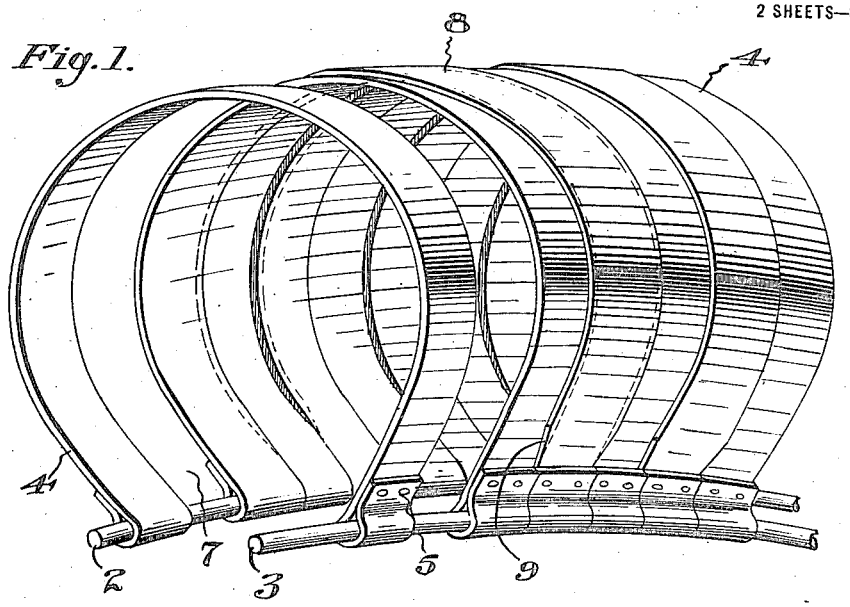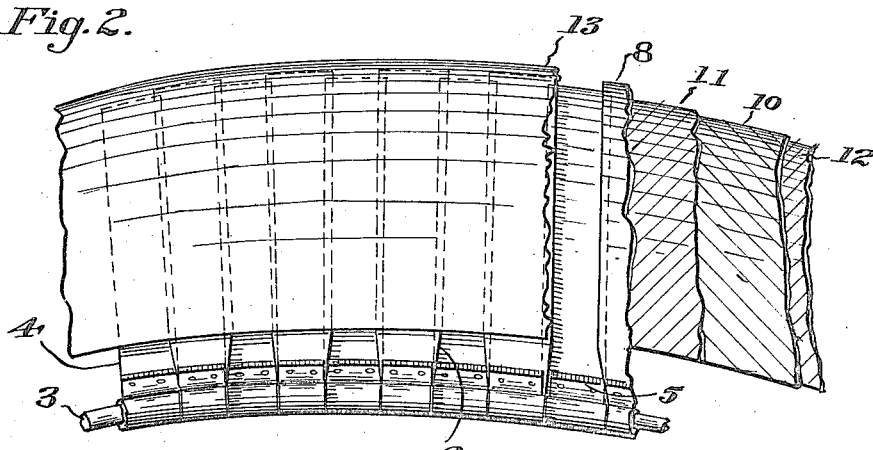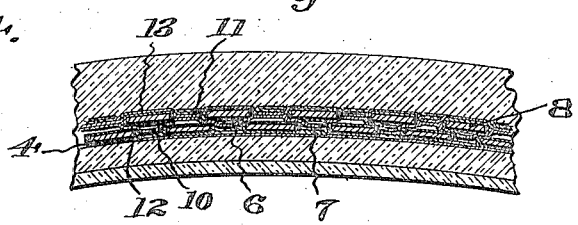

1,229,861.

Patented June 12, 1917.

WITNESSES:

INVENTOR
Gustav Auberlin
BY Strong & Townsend
ATTORNEYS

UNITED STATES PATENT OFFICE.

GUSTAV AUBERLIN, OF VALLEJO, CALIFORNIA.

PUNCTURE-PROOF PNEUMATIC TIRE.

1,229,861.

Specification of Letters Patent.

Patented June 12, 1917.

Application filed November 15, 1916. Serial No. 131,558.

*To all whom it may concern:*

Be it known that I, GUSTAV AUBERLIN, a citizen of the United States, residing at Vallejo, in the county of Solano and State of California, have invented new and useful Improvements in Puncture-Proof Pneumatic Tires, of which the following is a specification.

This invention relates to a puncture-proof pneumatic tire, and particularly to the outer tire casing which is employed on automobiles and like vehicles.

One of the objects of the present invention is to provide a metal armor embedded in the outer casing which consists of individual overlapping bands so constructed and arranged that perfect resiliency is permitted and puncturing of the inner tube prevented. Another object of the invention is to provide means for maintaining the individual bands in fixed, spaced relation to each other; and to provide a wrapping for each individual band which will prevent contact of metal to metal, thereby eliminating heating or cutting of the tire structure. Another object of the invention is to provide a flexible metal tire armor which will increase the strength of the casing to such an extent that blowouts through the side walls will be impossible; and also to provide an armor whose elements may be readily assembled during the building up or manufacturing operation. Further objects will hereinafter appear.

The invention consists of the parts and the construction and combination of parts as hereinafter more fully described and claimed, having reference to the accompanying drawings, in which—

Figure 1 is a detail, perspective view, showing the position of the inner and outer metal bands.

Fig. 2 is a fragmentary side elevation partly broken away for showing the relative position of the metal bands and the canvas coverings.

Fig. 4 is a detail, longitudinal section of the upper portion of the tire.

Figure 6:
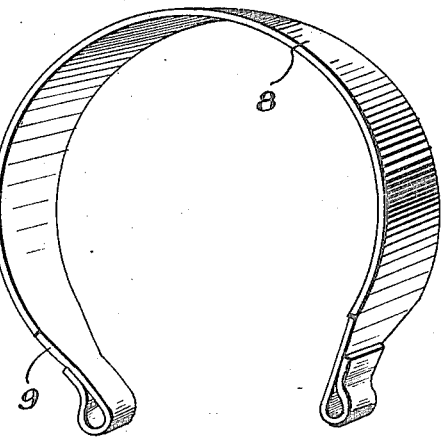
Fig. 6 is a perspective view of one of the outer metal bands.

The flexible metal armor, together with the canvas covering therefor, which forms the skeleton of the tire casing, is constructed in the following manner: 2 and 3 indicate a pair of metal rings, upon which is secured a plurality of inner metal bands 4. These bands may be constructed of strap iron or steel and are secured to the rings 2 and 3 by bending the ends over and securing same by rivets 5, or other suitable means. The inner bands are then wrapped with tape, canvas, or any other fabric, such as indicated at 6, and are spaced apart an even distance, as shown at 7. An outer layer of overlapping metal bands 8 is then wrapped and placed in the intermediate spaces 7. These bands are sufficiently wide (see Figs. 1 and 6) to overlap the inner bands 4 a suitable distance and their lower ends are tapered, as at 9, to permit them to be secured by riveting in a manner similar to the inner bands.

The inner bands, when applied and spaced apart as shown, are first covered with an inner and outer layer of canvas, such as indicated at 10 and 11, and these canvas sections are then sewed together or secured, by means of cement, both to the inner bands and the intermediate spaces 7. These canvas coverings are provided for the purpose of holding the inner bands in their spaced positions and are also employed for the purpose of separating the inner and outer bands. The outer bands, when applied, are also covered with an inner and outer layer of canvas, such as indicated at 12 and 13, which in turn are sewed or cemented together to secure the outer bands in their fixed spaced positions. The armor thus comprises two concentrically arranged series of metal bands having their ends pivotally connected in common to the side rings.

The depressions formed between the outer bands are then filled with strips of canvas, or other material, to present a smooth surface which is then ready to receive the rubber covering of the tire. Three strips of canvas, such as indicated at 14, 15 and 16, are secured on the inside of the carcass to prevent the bands from kinking when the tire is subjected to a heavy pressure. The carcass is then placed in the vulcanizer and an inner and outer covering of rubber, such as shown at 17 and 18, are then applied.

Practically speaking, a puncture-proof flexible metal armor is in this manner embedded interiorly of the tire casing, and as each individual band is wrapped and positively held in spaced position, one with relation to the other, it can readily be seen that contact of metal to metal is avoided. Any heating of the rubber structure or cutting thereof is, furthermore, prevented and the side walls are reinforced and strengthened to such an extent that blow-outs are positively prevented. As each individual metal band is fastened to the rings 2 and 3, it becomes possible to provide a pivotal connection which permits perfect freedom of movement when the individual bands are flexed or expanded. The structure, furthermore, strengthens and reinforces the tire beads around the entire periphery or at such points where they are engaged by the wheel or clencher rims.

Figure 3:
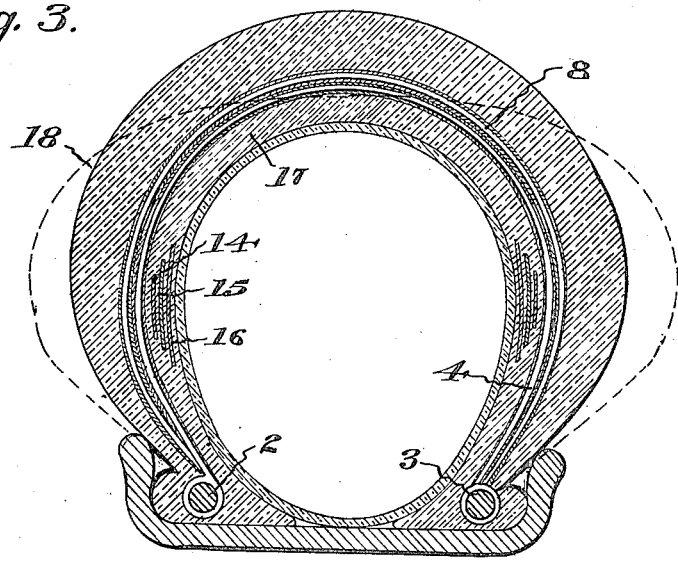
Fig. 3 is a cross section of the tire, showing the bands connected to the side rings in a slightly modified manner.
Figure 5:
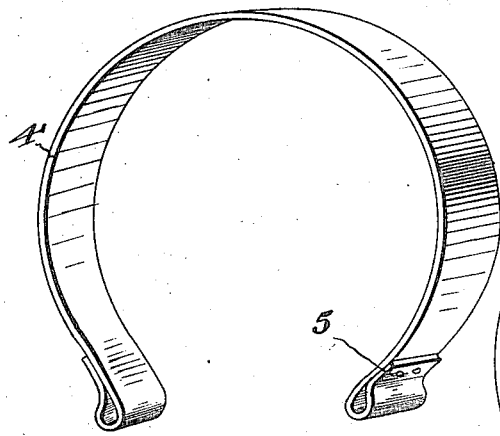
Fig. 5 is a perspective view of one of the inner metal bands.

The reinforcing strips 14, 15 and 16 provided form fillers or braces interiorly of the bands which prevent too much bending or flexing of same when subjected to heavy loads. These reinforcing strips are of considerable importance as they would otherwise permit the bands to kink and break at these points when the tire goes flat. This can readily be seen by referring to the dotted line position of the tire shown in Fig. 3. This position would be assumed if the reinforcing strips were not provided, but this is positively prevented in the present instance and any bending in the tire will, therefore, be more equally distributed throughout the whole circumference of the individual bands.

Having thus described my invention, what I claim and desire to secure by Letters Patent is—

1. In a tire casing, an inner, flexible, metal armor, comprising a pair of rings, one on each side of the tire, an inner set of interspaced, U-shaped, metal bands pivotally secured to said rings, and an outer set of interspaced U-shaped metal bands overlying the inner set of bands and having their ends reduced and pivotally secured to the rings.

2. In a tire casing, an inner, flexible, metal armor, comprising a pair of rings, an inner set of interspaced, U-shaped, metal bands secured to said rings, a fabric covering for each band, an inner and outer fabric covering strip inclosing the entire set of inner bands, means securing said inner and outer covering strips to each other between the bands and to the latter to secure the bands in their spaced positions, an outer set of U-shaped, interspaced, metal bands overlapping the inner set of bands, said outer set being also secured to the rings, a fabric covering for each individual band in the outer set, and an outer and inner fabric strip inclosing the entire inner and outer set.

3. In a tire, the combination with a suitable body of reinforcing members therein, consisting of arched steel bands arranged in two circumferential concentric series, and a single ring on each side of the tire to which the adjacent ends of both series of arches are pivotally connected in common.

4. In a tire casing, an armor comprising a pair of side rings, and a plurality of resilient and arcuate metal bands having their ends connected to the side rings, certain of said bands being longer and of greater diameter than the others to be disposed outwardly of the latter.

In testimony whereof I have hereunto set my hand in the presence of two subscribing witnesses.

GUSTAV AUBERLIN.

Witnesses:
FRANCES V. COLE,
W. W. HEALEY.

Copies of this patent may be obtained for five cents each, by addressing the "Commissioner of Patents, Washington, D. C."